US 8,677,406 B2

(12) United States Patent
Berkoff

(10) Patent No.: US 8,677,406 B2
(45) Date of Patent: Mar. 18, 2014

(54) TIME-SHIFT RECORDING BUFFER AS HOME NETWORK OBJECTS

(75) Inventor: Russell A. Berkoff, Sunnyvale, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 400 days.

(21) Appl. No.: 12/413,206

(22) Filed: Mar. 27, 2009

(65) Prior Publication Data
US 2010/0251297 A1 Sep. 30, 2010

(51) Int. Cl.
*G06F 3/00* (2006.01)
*G06F 13/00* (2006.01)
*H04N 5/445* (2011.01)

(52) U.S. Cl.
USPC ................................ 725/39; 725/78; 725/153

(58) Field of Classification Search
None
See application file for complete search history.

(56) References Cited

U.S. PATENT DOCUMENTS

| | | | | |
|---|---|---|---|---|
| 6,972,680 | B2* | 12/2005 | Yui et al. | 340/540 |
| 7,917,930 | B2* | 3/2011 | Nakata et al. | 725/78 |
| 2003/0149988 | A1* | 8/2003 | Ellis et al. | 725/87 |
| 2005/0166258 | A1* | 7/2005 | Vasilevsky et al. | 725/138 |
| 2007/0106762 | A1* | 5/2007 | Kim et al. | 709/219 |
| 2007/0186229 | A1* | 8/2007 | Conklin et al. | 725/14 |
| 2007/0268414 | A1* | 11/2007 | Hsu | 348/725 |
| 2008/0313689 | A1* | 12/2008 | Suzuki et al. | 725/118 |
| 2009/0106793 | A1* | 4/2009 | Tecot et al. | 725/38 |
| 2009/0201994 | A1* | 8/2009 | Schwarz et al. | 375/240.18 |
| 2009/0288125 | A1* | 11/2009 | Morioka | 725/110 |

OTHER PUBLICATIONS

User Manual:Daily Use—MythTV, http://www.mythtv.org/wiki/User_Manual:Daily_Use Page was last modified Jan. 26, 2009.

* cited by examiner

*Primary Examiner* — Nnenna Ekpo
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method is provided comprising: creating a temporary home network electronic program guide object for a television program currently stored in a time-shift buffer of a home network-enabled device; and storing an identifier for the temporary home network electronic program guide object in an object for a channel.

20 Claims, 4 Drawing Sheets

TIME-SHIFT RECORDING BUFFER AS HOME NETWORK OBJECTS

BACKGROUND OF THE INVENTION

1. Field of the Invention

The present invention relates generally to home networking. More specifically, the present invention relates to describing the contents of a time-shift recording buffer as a series of home network objects.

2. Description of the Related Art

Home networking has advanced from the early days of merely linking computers and printers to the modern home network, which can include mobile devices, televisions, set-top boxes, home appliances, heating/cooling systems, etc.

Universal Plug and Play (UPnP) is a distributed, open networking architecture that allows devices to connect seamlessly and to simplify the implementation of networks in the home (data sharing, communications, and entertainment). UPnP achieves this by defining and publishing UPnP device control protocols built upon open, Internet-based communication standards.

UPnP has grown in popularity of late in part due to the rise in popularity of media servers. Media servers are self-contained computing devices that store multiple types of content (e.g., photos, music, videos, etc.). The content may then be streamed over the home network from a media server to one or more rendering devices that will play the content. Control points obtain information about content (also known as metadata) and command the media renders to accept content. A control point may be integrated with (contained within) a rendering device such as a network-enabled Digital Television Receiver (DTV), or may be a separate controller which directs a media rendering device to obtain content from a media server.

Personal Video Recorders (PVRs), also known as Digital Video Recorders (DVRs), are devices that record video in a digital format to a disk drive or other non-volatile memory medium within a device.

A time-shift buffer is a block of memory that temporarily records a limited amount of currently tuned signals. Unlike a PVR, a time-shift buffer is typically "always-enabled," i.e., the end-user does not need to take any explicit action to enable recording to take place. Once the length of the buffer has been exceeded (the buffer size is typically measured in time, such as 60 minutes), the portion that is older than the buffer time is automatically discarded.

Set-top boxes are devices that accept external signals and convert these inputs to forms viewable on digital television receivers. Examples of set top boxes include cable boxes and satellite receivers.

Network-enabled set-top boxes are devices that make received content available on the home network. These set-top boxes can contain value-added features such a PVRs and/or time-shift buffers to improve functionality delivered to end-users.

UPnP current provides specifications to control PVRs over a home network. This specification is referred to as the UPnP ScheduledRecording service. UPnP also currently provides specifications to publish media objects over the home network. This specification is referred to as the UPnP ContentDirectory service.

One of the media objects the ContentDirectory service can make available on the home network is an Electronic Programming Guide (EPG) object. This object describes a broadcast program in terms of its start and end times, its channel or address on the network, its title, and description.

One of the media objects the ContentDirectory service can make available on the home network is a VideoBroadcast (Channel) object. A Channel object describes a streaming content (broadcast) source that may be transmitted over the home-network to media rendering devices. A channel object may contain additional information about the channel, its channel number, and call-sign, for example.

SUMMARY OF THE INVENTION

In a first embodiment of the present invention, a method is provided comprising: creating a temporary home network electronic program guide object for a television program currently stored in a time-shift buffer of a home network-enabled device; and storing an identifier for the temporary home network electronic program guide object in an object for a channel.

In a second embodiment of the present invention, a method is provided comprising: providing a first temporary UPnP EPG object, wherein the first temporary UPnP EPG object contains metadata regarding a first television program stored in a time-shift buffer in a personal video recorder.

In a third embodiment of the present invention, a home network-enabled device is provided comprising: means for creating a temporary home network electronic program guide object for a television program currently stored in a time-shift buffer of a home network-enabled device; and means for storing an identifier for the temporary home network electronic program guide object in an object for a channel.

In a fourth embodiment of the present invention, a program storage device readable by a machine tangibly is provided, embodying a program of instructions executable by the machine to perform a method comprising: creating a temporary home network electronic program guide object for a television program currently stored in a time-shift buffer of a home network-enabled device; and storing an identifier for the temporary home network electronic program guide object in an object for a channel.

DETAILED DESCRIPTION OF SPECIFIC EMBODIMENTS

Figure 1:
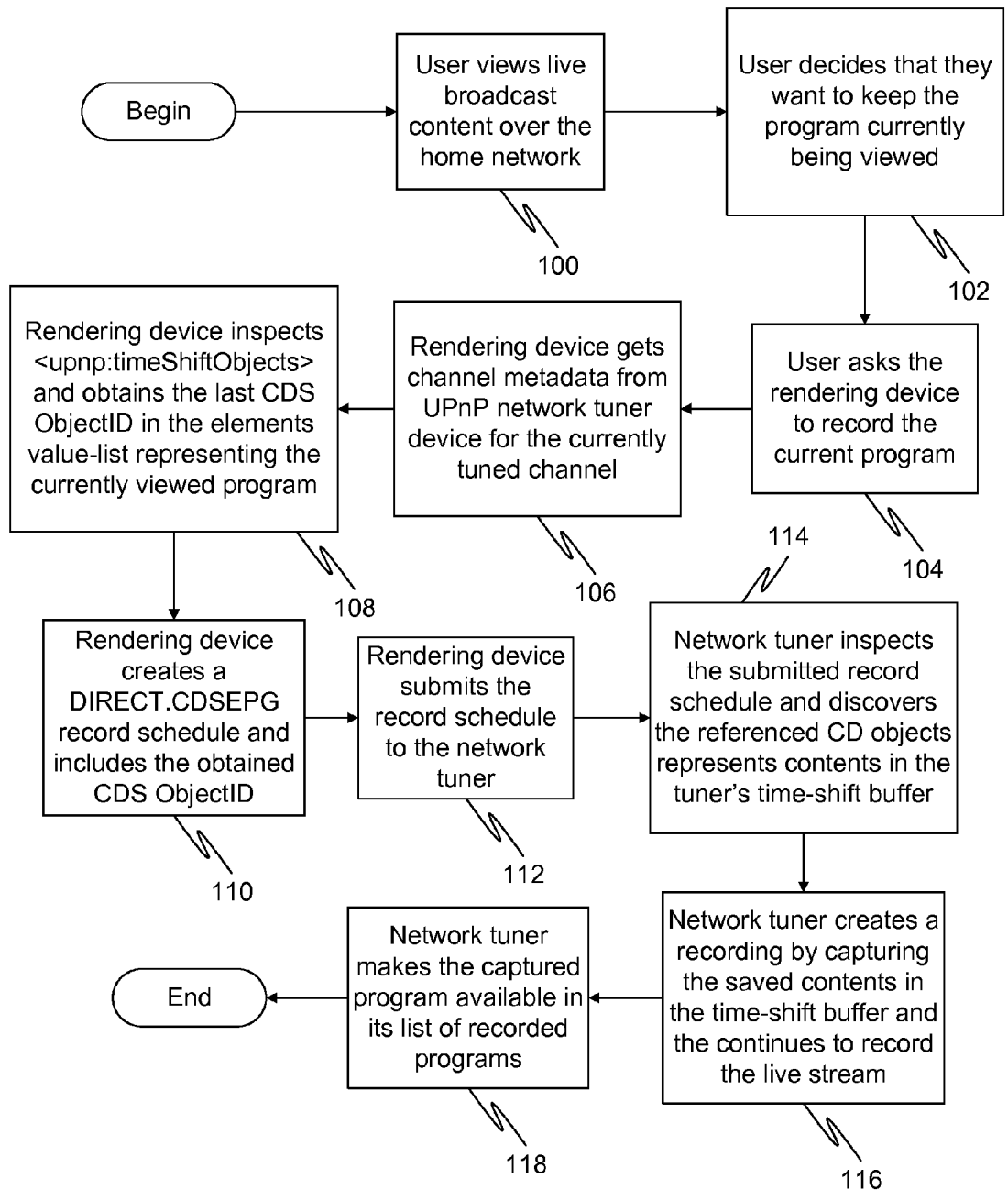
FIG. 1 is a flow diagram illustrating a first scenario in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

The UPnP Scheduled Recording Service provides personal video recorder functions in UPnP devices. The two common recording modes are manual recording and cdsEPG recording. In manual recording, the user of the recording service provides the channel, date/time, and duration of the recording. In cdsEPG recording, the user of the recording service provides the identity of an Electronic Programming Guide (EPG) object and the necessary recording information (such as channel, date/time, etc.) is extracted from that object.

In some situations it may be beneficial to allow users to record programs already stored in the time-shift buffer. For example, a user may simply be flipping channels and then begin to watch a show and then later discover that the user enjoys the show. At that point, the user wishes to record the show in its entirety, even though part of all of it has been stored in the temporary time-shift buffer.

In an embodiment of the present invention, the contents of the time shift buffer are described as a list of temporary content directory service Electronic Programming Guide objects. These objects are then added/removed from the list as programs are added/deleted from the time-shift buffer. This allows a scheduled recording control point to use existing ContentDirectory service actions such as "Browse" to inspect the temporarily EPG objects and then use the "manual" service to request recording of programs currently in the time-shift buffer. This allows end-user inspection and modification of the recording parameters. Temporary EPG objects created in this way can optionally have a <res> (network addressing) element, which allows viewing from network-based UPnP rendering devices, allowing any device in a UPnP network to access the content of a time-shift buffer of any other device in the UPnP network. This case is useful, for example, in the case where a user is watching television using one time-shift buffer-equipped DTV and then moved to a different room also equipped with a network-enabled DTV device. The user can then resume viewing of the original program by accessing the time-shift buffer of the original viewing device avoiding missing any program content.

The following UPnP ContentDirectory item shows a Channel object with a time-shift metadata element in accordance with an embodiment of the present invention.

```
<item id="channel_abc" parentID="atsc_channels">
    <dc:title>ABC Digital HD</dc:title>
    <upnp: class>object.item.videoBroadcast</upnp:class>
    <upnp:callSign>WABC</upnp:callSign>
    <upnp:channel type="analog">11-1</upnp:channel>
    <upnp: programList>
        <upnp: program preserved="1">temp_epg_001</upnp:program>
        <upnp: program preserved="1">temp_epg_002</upnp:program>
        <upnp: program preserved="1">temp_epg_003</upnp:program>
    </upnp:programList>
</item>
```

The above format includes a "preserved=x" entry that indicates whether or not a program is available in the time-shift value. A value of "0" indicates that the program may be either a future program or a program that was missed (either aged out or captured) in the time-shift buffer. The implementation may manage the list as it sees fit, e.g., it may exclude non-preserved ("preserved=0") programs. The following UPnP ContentDirectory item shows a temporary EPG object created to represent the contents of the time-shift buffer.

```
<item id="temp_epg_001" parentID="time_shift_recordings">
    <dc:title>One Life to Live</dc:title>
    <upnp:class>object.item.videoItem</upnp:class>
    <upnp:scheduledStartTime>2008-11-21T16:00:00
    </upnpscheduledStartTime>
    <upnp:scheduledEndTime>2008-11-21T16:30:00
    </upnp:scheduledEndTime>
    <!----Alternative settings for programPreserved property-->
        <!--1. Full TSB copy of completed program -->
        <upnp:programPreserved>COMPLETE</upnp:programPreserved>
        <!-2. Full TSB copy of ongoing program -->
        <upnp:programPreserved>ONGOING</upnp:programPreserved>
        <!-3. Partial TSB copy of ongoing program (start-of-program missed) -->
        <upnp:programPreserved startTime="2008-11-21T16:10:00">
        ONGOING
        </upnp:programPreserved>
        <!-4. Partial TSB copy of completed program (end-of-program missed)-->
        <upnp:programPreserved endTime="2008-11-21T16:25:00">
        COMPLETE
        </upnp:programPreserved>
    <res protocolInfo="http-get:*:video/mpeg:">
        http://127.0.0.1/timeshift_buffer_recordings/temp_epg_001</res>
    </res>
</item>
```

The overall status ONGOING/COMPLETE indicates whether a program is still in progress or has been completed due to the program ending or the channel being switched.

The startTime= and endTime= are only present if there was a deviation from the scheduledStartTime or scheduledEndTime properties. If the full program is present in the time-shift buffer, then these properties would be absent indicating the schedule properties should be referred to.

The <upnp:programList> element lists the temporary EPG objects that have been created to represent objects in the time-shift buffer. As program boundaries occur, new temporary EPG objects can be added to the end of the list. As programs "age-out" of the time-shift buffer, <upnp:program> child-elements containing the temporary EPG object ids at the beginning of the list can be removed.

The handling of partial programs at the start of the list (oldest in the time-shift buffer) is somewhat implementation dependent. In one implementation, the system may retain this partial program and dynamically updated its temporary EPG object until it is completely "aged-out" of the time-shift buffer. In another implementation, the system may remove the temporary EPG object as soon as the start point of the program is "aged-out" of the time-shift buffer.

The program at the end of the time-shift buffer list (newest in the time-shift buffer) may actually still be in progress. However, since the EPG can provide the duration of the current program, an accurate temporary EPG object can still be constructed.

The <upnp:programPreserved> element provides some additional information to address the considerations above, e.g., it indicates whether the EPG object contains the start of the program and whether the program is still in progress or is fully captured in the time-shift buffer.

FIG. 1 is a flow diagram illustrating a first scenario in accordance with an embodiment of the present invention. At 100, the user is viewing live broadcast content over the home network. The content is being provided from a UPnP device with a network tuner and a time-shift buffer as well as a ScheduledRecording service. At 102, the user decides that they want to keep the program currently being viewed. At 104, the user asks the rendering device to record the current program.

At 106, the rendering device gets the channel metadata from the UPnP network tuner device for the currently tuned channel. At 108, the rendering device inspects the <upnp:programList> and obtains the last EPG ObjectID in the elements value-list representing the currently viewed program. In one embodiment the "last" EPG Object ID is actually the EPG ObjectID value for the last <upnp:programPreserved="1"> element. At 110, the rendering device creates a "DIRECT.CDSEPG" record schedule and includes the obtained EPG ObjectId. At 112, the rendering device submits the record schedule to the network tuner.

At 114, the ScheduledRecording service in the network tuner inspects the submitted record schedule and discovers the referenced CDS object represents contents in the tuner's time-shift buffer. At 116, the network tuner creates a recording by capturing the contents in the time-shift buffer and then continues to record the live stream. At 118, the network tuner makes the captured program available in its list of recorded programs.

Figure 2:
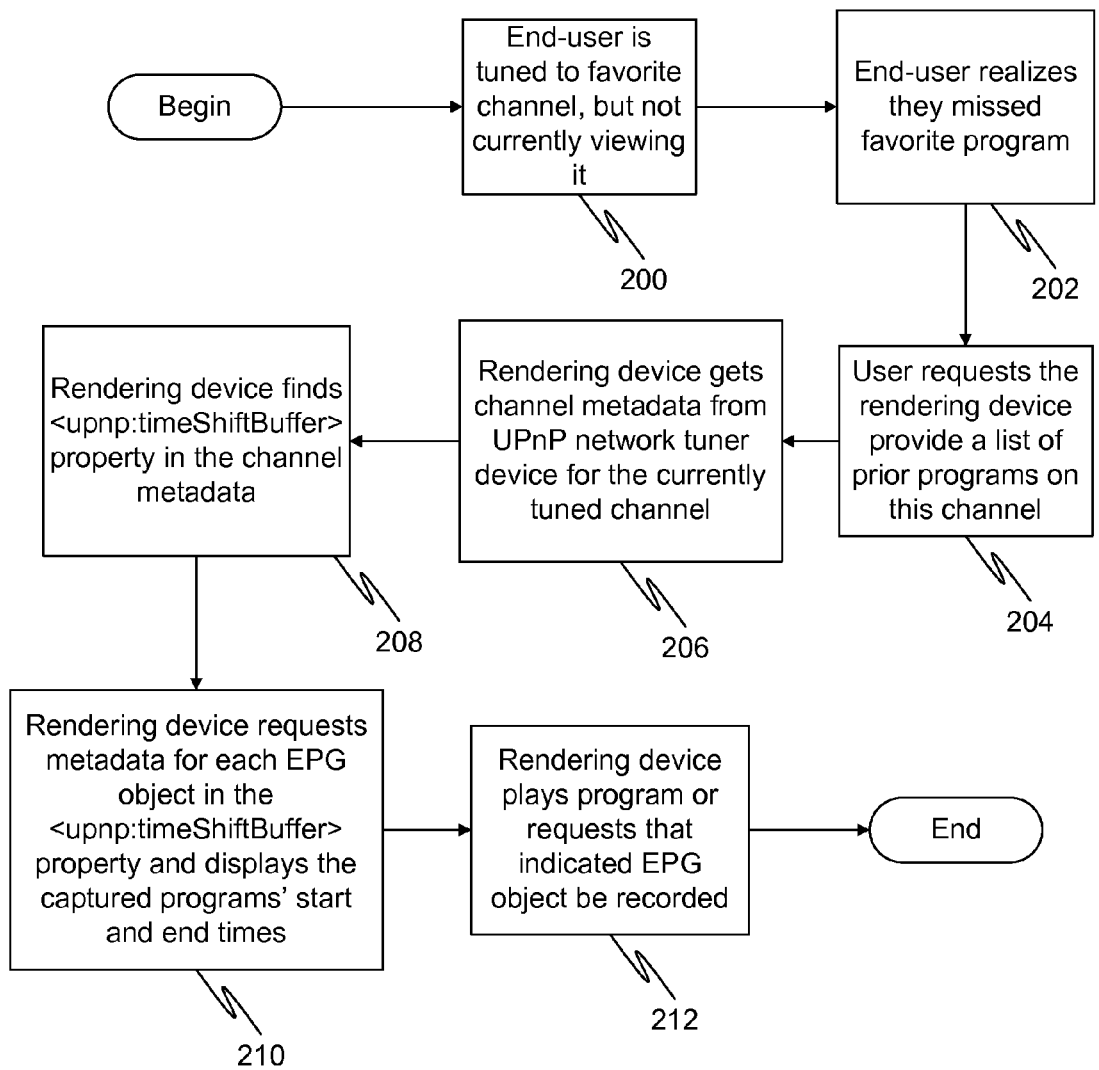
FIG. 2 is a flow diagram illustrating a second scenario in accordance with an embodiment of the present invention.

FIG. 2 is a flow diagram illustrating a second scenario in accordance with an embodiment of the present invention. At 200, the end-user is tuned to their favorite channel, but is not currently viewing it. Once again, the content is being provided from a UPnP device with a network tuner and a time-shift buffer with an optional scheduled recording service. At 202, the user realizes they missed their favorite program. At 204, the end-user requests the rendering device provide a list of prior programs on this channel.

At 206, the rendering device gets the channel metadata from the UPnP network tuner device for the currently tuned channel. At 208, the rendering device finds the <upnp:programList> property in the channel metadata. Each objectID listed in a child <upnp:program> property represents an EPG object for a program captured in the time-shift buffer. At 210, the rendering device requests metadata for each EPG object and displays the captured programs' start and end times. At 212, the rendering device either directly plays the program or requests that the indicated EPG object be recorded. Some content providers may wish to limit the rendering device to only directly replay the program as opposed to recording it.

Figure 3:
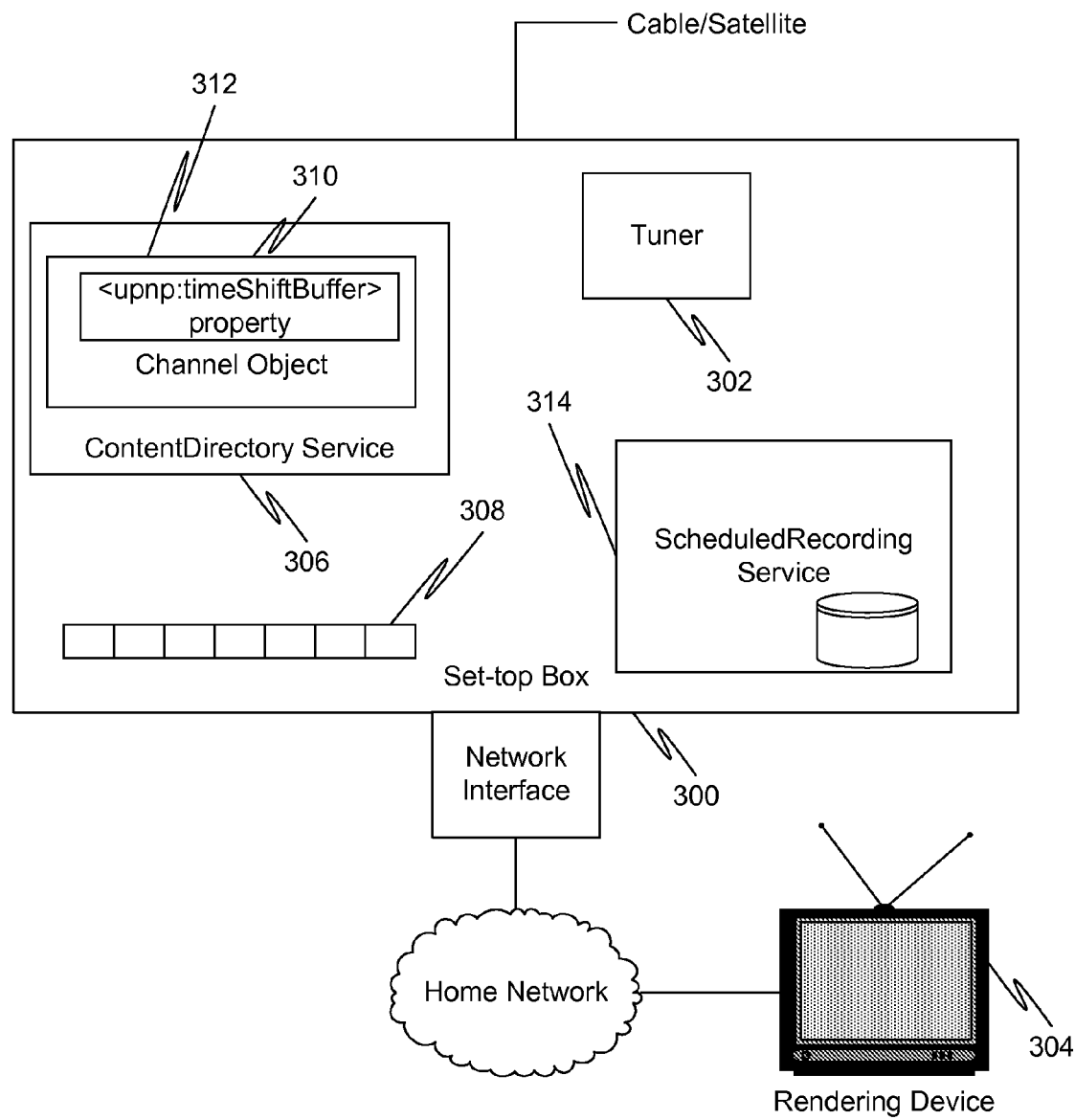
FIG. 3 is a block diagram illustrating the architecture of a personal video recording system in accordance with an embodiment of the present invention.

FIG. 3 is a block diagram illustrating the architecture of a personal video recording system in accordance with an embodiment of the present invention. The system includes a network enabled set-top box 300 that contains a network tuner 302. It should be noted that box 300 could be many different types of hardware and software devices and should not be limited to any one particular implementation. The box 300 has or maintains a time-shift buffer. The box 300 may optionally have personal video recorder capability. The system then also includes a network rendering device 304. In one embodiment, the set-top box 300 is a hardware device including a processor, memory, and a hard drive, while the network rendering device is a television. However, embodiments are possible wherein these devices reside on the same physical device (e.g., a television with PVR services built in). The set-top box 300 also includes a ContentDirectory service 306. The ContentDirectory service has a time shift buffer 308 that stores television programs as they are currently being tuned. It should be noted that in the strict sense, the ContentDirectory service (or the ScheduledRecording service, for that matter) does not actually "contain" the time-shift buffer. Instead, the ContentDirectory service contains EPG objects which describe contents of the time-shift buffer while the ScheduledRecording service obtains these objects and fetches contents of the tine-shift buffer to transfer them to disk. The time shift buffer 308 itself can store many programs, depending upon the size of the buffer. It should be noted that in some implementations the time-shift buffer 308 may clear out its contents when the user changes the channel while in other embodiments programs on previously tuned channels may be left in the buffer until "aged-out" normally. For example, if a user was watching CSI on one channel and then switches the channel to watch E.R., in one embodiment the portion of CSI that was placed in the buffer prior to the channel switch is left in the buffer until aged-out normally, while in another embodiment the portion of CSI that was placed in the buffer prior to the channel switch is erased as soon as the channel is changed.

The ContentDirectory service 306 also contains a channel object 310 having a <upnp:programList> 312, which contains a child-element listing the identity of a temporary home network electronic program guide object for a television program stored in the buffer 308. The set-top box 300 also contains a ScheduledRecording service 314.

Figure 4:
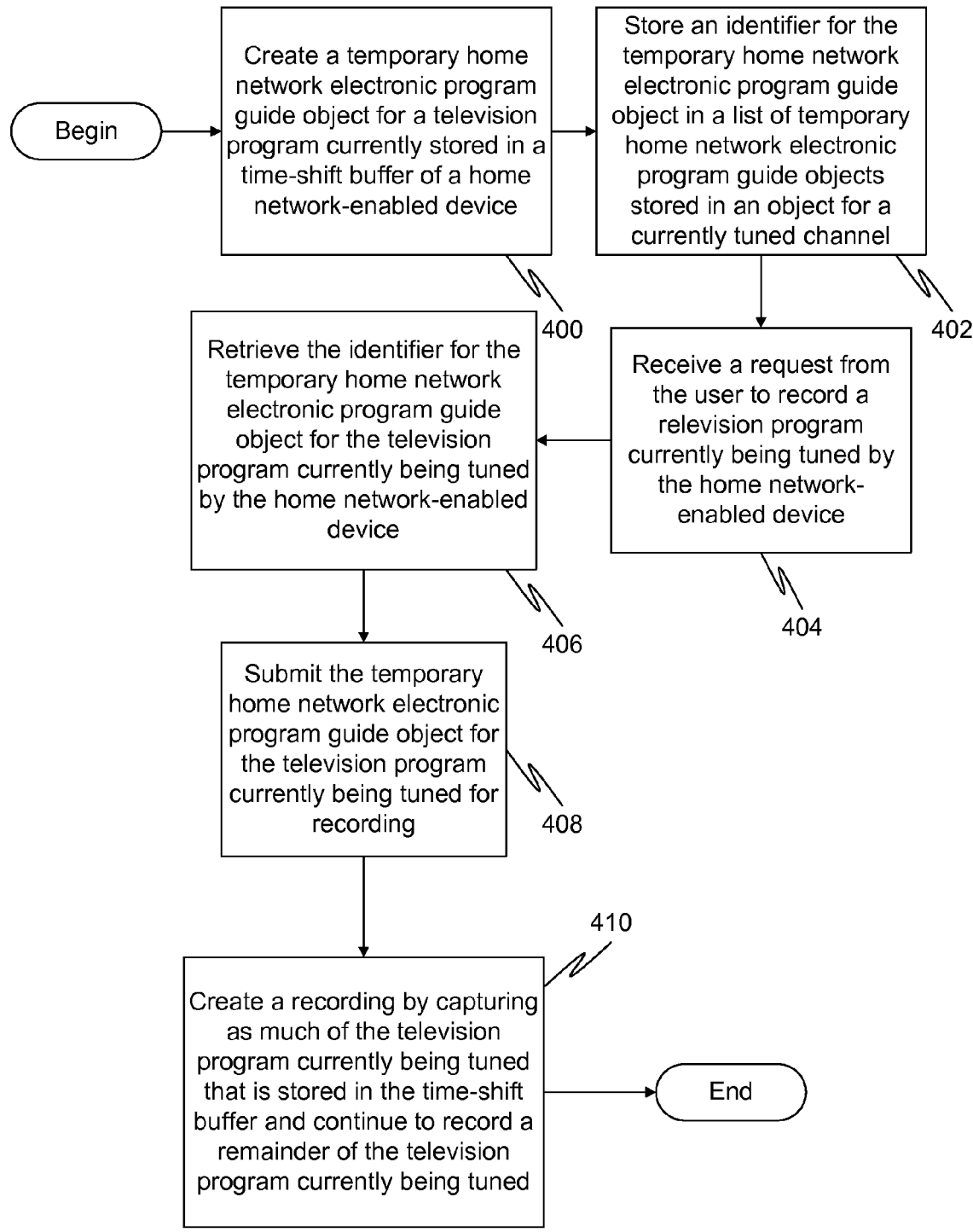
FIG. 4 is a flow diagram illustrating a method in accordance with an embodiment of the present invention.

FIG. 4 is a flow diagram illustrating a method in accordance with an embodiment of the present invention. At 400, a temporary home network electronic program guide object is created for a television program currently stored in a time-shift buffer of a home network-enabled personal video recorder. At 402, an identifier for the temporary home network electronic program guide object is stored in a list of temporary home network electronic program guide objects stored in an object for a currently tuned channel. This may be stored, for example, in the <upnp:programList property of the channel object. At 404, a request is received from a user to record a television program currently being tuned by the home network-enabled personal video recorder. At 406, the identifier for the temporary home network electronic program guide object is obtained from the channel object for the currently tuned channel. At 408, the temporary home network electronic program guide object for the television program currently being tuned (as identified by the identifier retrieved in 406) is submitted to a recording service for recording. At 410, the recording service responds to step 408 by creating a recording by capturing as much of the television program currently being tuned that is stored in the time-shift buffer and continuing to record a remainder of the television program currently being tuned. The recording service may be, for example, a ScheduledRecording service.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for operating a television program recording service comprising:
   creating a non-temporary home network electronic program guide (EPG) object for any television program selected for recording by the television program recording service;
   creating a temporary home network electronic program guide (EPG) object for a television program currently stored in a time-shift buffer of a first home network-enabled device, wherein the temporary home network EPG object is distinct from the television program stored in the time shift buffer and indicates whether the television program is fully in the time shift buffer, is ongoing or has ended and wherein the first home network-enabled device is located in a first home network and is capable of playing the television program, wherein the television program currently stored in the time-shift buffer has not been selected for recording by the television program recording service, and wherein the time-shift buffer is a block of memory that temporarily records a limited amount of currently tuned signals regardless of whether the currently tuned signals are actually being recorded and without explicit action required to enable temporary recording to take place;
   inserting a network addressing element in the temporary home network electronic program guide object; and
   storing an identifier for the temporary home network electronic program guide object in an object for a channel;
   receiving a request, from a second home network-enabled device, to display available programs stored in the time-shift buffer of the first home network-enabled device, wherein the request involves a UPnP protocol;
   receiving a selection, from the second home network-enabled device of one of the available programs stored in the time-shift buffer of the first home network-enabled device; and
   sending the selected program from the time-shift buffer of the first home network-enabled device to the second home network-enabled device for display.

2. The method of claim 1, further comprising:
   receiving a request from a user to record a television program currently being tuned by the first home network-enabled device;
   retrieving a listing of identifiers for temporary home network electronic guide objects for television programs currently stored in the time-shift buffer;
   submitting an identifier for the temporary home network electronic guide objects corresponding to the television program the user wishes to record to a recording service for recording.

3. The method of claim 2, wherein, in response to the submitting, the recording service creates a recording by capturing as much of the television program currently being tuned that is stored in the time-shift buffer and continuing to record a remainder of the television program currently being tuned.

4. The method of claim 1, further comprising:
   receiving a request for a list of television programs stored in the time-shift buffer; and
   retrieving, based on the list, temporary home network electronic program guide objects for the television programs stored in the time-shift buffer.

5. The method of claim 4, further comprising:
   receiving a request from a user to record a television program stored in the time-shift buffer;
   using the temporary home network electronic program guide object retrieved for the requested television program to determine if the requested television program is still being tuned;
   if the requested television program is still being tuned, capturing as much of the requested television program that is stored in the time-shift buffer and continuing to record a remainder of the requested television program.

6. The method of claim 1, wherein the home network enabled device is a Universal Plug and Play (UPnP) enabled device with time shift buffer capabilities.

7. The method of claim 6, wherein the temporary home network electronic program guide object is a UPnP ContentDirectory item.

8. The method of claim 1, further comprising:
   receiving a request to select a program in the time-shift buffer; and
   forwarding the program to a rendering device for viewing.

9. A method comprising:
   providing a first temporary UPnP EPG object, wherein the first temporary UPnP EPG object contains metadata regarding a first television program stored in a time-shift buffer in a first personal video recorder, wherein the first temporary UPnP EPG object is distinct from the television program stored in the time shift buffer and indicates whether the television program is fully in the time shift buffer, is ongoing or has ended and wherein the first personal video recorder is located in a first home network and is capable of playing the first television program, wherein the first temporary UPnP EPG object further contains a network addressing element allowing a second personal video recorder to access the first television program stored in the time shift buffer in the first personal video recorder, wherein the television program currently stored in the time-shift buffer is not selected for recording by a television program recording service, and wherein the time-shift buffer is a block of memory that temporarily records a limited amount of currently tuned signals regardless of whether the currently tuned signals are actually being recorded without explicit action required to enable temporary recording to take place.

10. The method of claim 9, further comprising
    providing a second temporary UPnP EPG object, wherein the second temporary UPnP EPG object contains metadata regarding a second television program stored in a time-shift buffer; and
    providing a UPnP channel, wherein a channel object contains a property listing identities of the first and second temporary UPnP EPG objects.

11. The method of claim 9, further comprising:
    providing a mechanism to differentiate between a temporary UPnP EPG object and an ordinary UPnP EPG object.

12. A home network-enabled device located in a home network and capable of playing a television program, comprising:
    a time-shift buffer, wherein the time-shift buffer is a block of memory that temporarily records a limited amount of currently tuned signals regardless of whether the currently tuned signals are actually being recorded and without explicit action required to enable temporary recording to take place;

a content directory service capable of:
  creating a non-temporary home network electronic program guide object for any television program selected for recording by a television program recording service;
  creating a temporary home network electronic program guide (EPG) object for television program currently stored in a time-shift buffer of a first home network-enabled device, wherein the temporary home network EPG object is distinct from the television program stored in the time shift buffer and indicates whether the television program is fully in the time shift buffer, is ongoing or has ended and wherein the television program currently stored in the time-shift buffer is not selected for recording by the television program recording service;
  inserting a network addressing element in the temporary home network electronic program guide object;
  storing an identifier for the temporary home network electronic program guide object in an object for a channel;
  receiving a request, from a second home network-enabled device, to display available programs stored in the time-shift buffer of the first home network-enabled device;
  receiving a selection, from the second home network-enabled device of one of the available programs stored in the time-shift buffer of the first home network- enabled device; and
  sending the selected program from the time-shift buffer of the first home network-enabled device to the second home network-enabled device for display.

13. The home network-enabled device of claim 12, wherein the content directory service is further capable of:
  receiving a request from a user to record a television program currently being tuned by the first home network-enabled device;
  retrieving a listing of identifiers for temporary home network electronic guide objects for television programs currently stored in the time-shift buffer;
  submitting an identifier for the temporary home network electronic guide objects corresponding to the television program the user wishes to record to a recording service for recording.

14. The home network-enabled device of claim 13, wherein, in response to the submitting, the recording service creates a recording by capturing as much of the television program currently being tuned that is stored in the time-shift buffer and continuing to record a remainder of the television program currently being tuned.

15. The home network-enabled device of claim 12, wherein the content directory service is further capable of:
  receiving a request for a list of television programs stored in the time-shift buffer; and
  retrieving, based on the list, temporary home network electronic program guide objects for the television programs stored in the time-shift buffer.

16. The home network-enabled device of claim 15, wherein the content directory service is further capable of:
  receiving a request from a user to record a television program stored in the time-shift buffer;
  using the temporary home network electronic program guide object retrieved for the requested television program to determine if the requested television program is still being tuned;
  if the requested television program is still being tuned, capturing as much of the requested television program that is stored in the time-shift buffer and continuing to record a remainder of the requested television program.

17. The home network-enabled device of claim 12, wherein the home network enabled device is a Universal Plug and Play (UPnP) enabled set-top box with time-shift buffer capabilities.

18. The home network-enabled device of claim 17, wherein the temporary home network electronic program guide object is a UPnP ContentDirectory item.

19. The home network-enabled device of claim 12, wherein the content directory service is further capable of
  receiving a request to select a program in the time-shift buffer; and
  forwarding the program to a rendering device for viewing.

20. A program storage device readable by a machine tangibly embodying a program of instructions executable by the machine to perform a method comprising:
  creating a non-temporary home network electronic program guide object for any television program selected for recording by a television program recording service;
  creating a temporary home network electronic program guide (EPG) object for a television program currently stored in a time-shift buffer of a first home network-enabled device, wherein the temporary home network EPG object is distinct from the television program stored in the time shift buffer and indicates whether the television program is fully in the time shift buffer, is ongoing or has ended and wherein the first home network-enabled device is located in a first home network and is capable of playing the television program, wherein the television program currently stored in the time-shift buffer has not been selected for recording by the television program recording service, and wherein the time-shift buffer is a block of memory that temporarily records a limited amount of currently tuned signals without explicit action required to enable temporary recording to take place;
  inserting a network addressing element in the temporary home network electronic program guide object; and
  storing an identifier for the temporary home network electronic program guide object in an object for a channel;
  receiving a request, from a second home network-enabled device, to display available programs stored in the time-shift buffer of the first home network-enabled device;
  receiving a selection, from the second home network-enabled device of one of the available programs stored in the time-shift buffer of the first home network-enabled device; and
  sending the selected program from the time-shift buffer of the first home network- enabled device to the second home network-enabled device for display.

* * * * *